United States Patent
Wang

(10) Patent No.: US 9,927,619 B2
(45) Date of Patent: Mar. 27, 2018

(54) PUPILLARY ADJUSTABLE HEAD MOUNTED DEVICE

(71) Applicant: OmniVision Technologies, Inc., Santa Clara, CA (US)

(72) Inventor: Yen-Sung Wang, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/935,096

(22) Filed: Nov. 6, 2015

(65) Prior Publication Data
US 2017/0131554 A1    May 11, 2017

(51) Int. Cl.
*G02B 27/14* (2006.01)
*G02B 27/01* (2006.01)
*G02C 5/04* (2006.01)

(52) U.S. Cl.
CPC ..... *G02B 27/0176* (2013.01); *G02B 27/0172* (2013.01); *G02B 2027/0154* (2013.01); *G02B 2027/0158* (2013.01); *G02B 2027/0161* (2013.01); *G02B 2027/0178* (2013.01); *G02C 5/045* (2013.01)

(58) Field of Classification Search
CPC ................ G02B 27/0176; G02B 27/0172
USPC ..... 359/630, 84, 694–706, 822–829; 351/97, 351/107, 109, 148–153
See application file for complete search history.

(56) References Cited

U.S. PATENT DOCUMENTS

| | | | |
|---|---|---|---|
| 660,990 | A | 10/1900 | Houghton |
| 2,832,114 | A | 4/1958 | Mead |
| 3,266,111 | A | 8/1966 | Abel |
| 3,600,069 | A | 8/1971 | McNeill |

(Continued)

FOREIGN PATENT DOCUMENTS

| CN | 101014896 A | 8/2007 |
|---|---|---|
| CN | 101490606 A | 7/2009 |

(Continued)

OTHER PUBLICATIONS

Non Final Office Action corresponding to U.S. Appl. No. 14/278,474, dated Aug. 1, 2016, 16 pages.

(Continued)

*Primary Examiner* — Thomas K Pham
*Assistant Examiner* — Vipin Patel
(74) *Attorney, Agent, or Firm* — Lathrop Gage LLP

(57) ABSTRACT

Embodiments of the present disclosure related to a head mounted display (HMD) that enable adjustment of lenses for a particular consumer. In some example embodiments, the HMD enables up to three-degrees of freedom of lens alignment with a consumer's pupils. For example, the HMD includes an actuation device or rotatable disc, both of which are in slidable engagement with at least one elongated members. Ends of the elongated members are coupled to a mirror/lens such that actuation of the actuation device or rotation of the disc translates the elongated member along an axis, which is in general alignment with a pupillary distance (PD) of the consumer. Additionally, the elongated members include mirror/lens interfaces to which the lenses are coupled. The mirror/lens interfaces are slidably and rotatably coupled to the elongated members thereby providing additional degrees of freedom for movement of the lenses.

10 Claims, 16 Drawing Sheets

(56) References Cited

U.S. PATENT DOCUMENTS

| | | | |
|---|---|---|---|
| 3,878,330 A * | 4/1975 | Novak | G02B 7/04 |
| | | | 348/240.3 |
| 5,159,639 A | 10/1992 | Shannon et al. | |
| 5,208,616 A * | 5/1993 | Chang | G02C 5/08 |
| | | | 351/158 |
| 5,347,400 A | 9/1994 | Hunter | |
| 5,487,522 A * | 1/1996 | Hook | F16C 11/0647 |
| | | | 248/483 |
| 5,664,293 A | 9/1997 | Bartoo | |
| 5,751,476 A * | 5/1998 | Matsui | G02B 27/0176 |
| | | | 359/411 |
| 5,886,822 A | 3/1999 | Spitzer | |
| 6,023,372 A | 2/2000 | Spitzer et al. | |
| 6,542,298 B1 | 4/2003 | Aoki | |
| 6,659,777 B1 * | 12/2003 | Rondeau | A63H 33/00 |
| | | | 108/44 |
| 6,747,611 B1 | 6/2004 | Budd et al. | |
| 6,992,718 B1 | 1/2006 | Takahara | |
| 7,419,260 B1 | 9/2008 | Wang | |
| 7,631,968 B1 | 12/2009 | Dobson et al. | |
| 7,675,684 B1 | 3/2010 | Weissman et al. | |
| 7,735,996 B2 | 6/2010 | Van Der Zwan et al. | |
| D624,111 S | 9/2010 | Knoop | |
| 8,159,751 B2 | 4/2012 | Martins | |
| D659,741 S | 5/2012 | Heinrich et al. | |
| D660,990 S | 5/2012 | Le et al. | |
| D664,185 S | 7/2012 | Heinrich et al. | |
| 8,373,690 B2 | 2/2013 | Kurozuka | |
| 8,388,138 B1 | 3/2013 | Boothroyd | |
| 8,508,851 B2 | 8/2013 | Miao et al. | |
| 2004/0169663 A1 | 9/2004 | Bernier | |
| 2006/0055866 A1 | 3/2006 | Dietz | |
| 2007/0251062 A1 | 11/2007 | Saitoh et al. | |
| 2008/0013051 A1 | 1/2008 | Glinski et al. | |
| 2008/0278812 A1 | 11/2008 | Amitai | |
| 2008/0284720 A1 | 11/2008 | Fukutome | |
| 2009/0007388 A1 | 1/2009 | Villeneuve | |
| 2009/0278766 A1 | 11/2009 | Sako et al. | |
| 2012/0032205 A1 | 2/2012 | O'Connor et al. | |
| 2012/0038549 A1 | 2/2012 | Mandella et al. | |
| 2012/0081658 A1 | 4/2012 | Sugihara et al. | |
| 2013/0016292 A1 | 1/2013 | Miao et al. | |
| 2013/0021658 A1 | 1/2013 | Miao et al. | |
| 2013/0050070 A1 | 2/2013 | Lewis et al. | |
| 2013/0083403 A1 | 4/2013 | Takagi et al. | |
| 2013/0113973 A1 | 5/2013 | Miao | |
| 2013/0114039 A1 | 5/2013 | Zelazowski | |
| 2013/0235331 A1 | 9/2013 | Heinrich et al. | |
| 2013/0250232 A1 | 9/2013 | Belbey et al. | |
| 2013/0314303 A1 | 11/2013 | Osterhout et al. | |
| 2015/0219919 A1 | 8/2015 | Ouderkirk et al. | |
| 2015/0234201 A1 | 8/2015 | Levesque | |

FOREIGN PATENT DOCUMENTS

| | | |
|---|---|---|
| CN | 101512632 A | 8/2009 |
| CN | 201307188 Y | 9/2009 |
| CN | 101963744 A | 2/2011 |
| CN | 202758142 U | 2/2013 |
| TW | 463057 B | 11/2001 |
| TW | 201300834 A | 1/2013 |
| TW | 201415088 A | 4/2014 |
| WO | 99/23525 A1 | 5/1999 |
| WO | 00/55676 A1 | 9/2000 |
| WO | 2008/008646 A2 | 1/2008 |

OTHER PUBLICATIONS

Non Final Office Action corresponding to U.S. Appl. No. 14/278,452, dated Aug. 18, 2016, 10 pages.
English Translation of 1st Office Action corresponding to Chinese application No. 201410222138.6 dated Mar. 3, 2016, 12 pages.
English Translation of 2nd Office Action corresponding to Chinese application No. 201410222138.6 dated Aug. 18, 2016, 12 pages.
English Translation of Office Action corresponding to Taiwan application No. 103117954 dated Jun. 27, 2016, 3 pages.
Chinese Patent Application No. 201410222138.6, Third Office Action dated Dec. 2, 2016 with English Translation, 23 pages.
U.S. Appl. No. 14/278,474 Final Office Action dated Nov. 23, 2016, 23 pages.
Notice of Allowance corresponding to U.S. Appl. No. 14/278,452, dated Aug. 17, 2017.
English translation of the Third Office Action corresponding to Chinese Patent Application No. 201410221982.7, dated Aug. 2, 2017, 11 pages.
Baranski et al. (Jan. 1, 2014) "Wafer-Level Fabrication of Microcube-Typed Beam-Splitters by Saw-Dicing of Glass Substrate," IEEE Photonics Technology Letters. 26(1):100-103.
Chuang et al. (Dec. 23, 2012) "Application of the Inclined Exposure and Molding Process to Fabricate a Micro Beam-Splitter With Nanometer Roughness," Microsyst Technology. 19:461-470.
Li et al. (1996) "Visible Broadband, Wide-Angle, Thin-Film Multilayer Polarizing Beam Splitter," Applied Optics. 35(13):2221-2225.
Notice of Allowance corresponding to U.S. Appl. No. 14/278,438, dated Mar. 7, 2016, 10 pgs.
Office Action corresponding to Chinese Application No. 201410221982.7, dispatched Jan. 24, 2017—English translation provided only.
Office Action corresponding to Chinese Patent Application No. 201410221982.7, dated May 5, 2016, 8 pgs.—English translation provided only.
Office Action corresponding to Chinese Patent Application No. 201410221984.6, dated May 27, 2016, 3 pgs.—English translation provided only.
Office Action corresponding to Chinese Patent Application No. 201410222332.4, dated May 15, 2015, 8 pgs.—with English translation.
Office Action corresponding to Taiwanese Patent Application No. 103117947, dated Aug. 27, 2015—with English summary, 10 pgs.
Office Action corresponding to U.S. Appl. No. 14/278,407, dated Jan. 26, 2017.
Office Action corresponding to U.S. Appl. No. 14/278,407, dated Jul. 21, 2016, 9 pgs.
Office Action corresponding to U.S. Appl. No. 14/278,438, dated Oct. 6, 2015, 8 pgs.
Office Action corresponding to U.S. Appl. No. 14/278,474, dated Feb. 22, 2017, 15 pgs.
Non-Final Rejection corresponding to U.S. Appl. No. 14/278,407, dated Oct. 3, 2017, 12 pages.
English translation of Office Action corresponding to Taiwan Patent Application No. 105133117 dated Dec. 13, 2017, 3 pages.

* cited by examiner

Clutch Lock

Location match

Clutch Release

PUPILLARY ADJUSTABLE HEAD MOUNTED DEVICE

BACKGROUND

Near-eye display systems are becoming more frequent in the marketplace. Such near-eye display systems typically mount directly to, or are integral with, glasses frames that include or do not include actual glasses lenses with the frames.

For example, U.S. Design Pat. No. D659,741 (hereinafter the "D'741 patent") depicts an exemplary glasses frame utilizing an integral mounted near-eye display system. As can be seen in the D'741 patent, the near-eye display system mounts directly to the right temple/earpiece portion of the glasses frames. Moreover, U.S. Design Pat. No. D664,185 (hereinafter the "D'185 patent") illustrates a glasses frame, without lenses, that include an integrally mounted near-eye display system. Unfortunately, near-eye display systems, such as those described above, require the consumer to wear a specific frame that is sold concurrently with the near-eye display system. Accordingly, such frames cannot accommodate consumers that require frames with specific dimensions.

SUMMARY

An embodiment of the present disclosure relates to a pupillary lens adjustable head mounted device (HMD). The HMD includes a facebar. A first mirror/lens attachment mount is slidably engaged with the facebar at a first longitudinal location of the facebar. The HMD also includes a first rod. The first rod includes a first end pivotally coupled to the first mirror/lens attachment mount and a second end pivotally coupled to an actuator. The HMD further includes a second rod. The second rod includes a first end pivotally coupled to a second mirror/lens attachment mount. The second mirror/lens attachment mount is slidably engaged with the facebar at a second longitudinal location of the facebar. The second rod also includes a second end pivotally coupled to the actuator.

Another embodiment of the present disclosure relates to a pupillary lens adjustable head mounted device (HMD) coupled to a glasses frame. The HMD includes a disc having a pivot positioned at about a center thereof. The pivot extends from a top surface of the disc to enable rotation of the disc around a central axis of the disc. A first arcuate aperture extends between first and second end points and is further positioned within first and second quadrants of the disc. The first endpoint is positioned at about a centerline of the disc and is spaced from the pivot by a distance $d_1$. In this embodiment, the centerline extends through the pivot. The second endpoint is positioned at about the centerline of the disc and is spaced from the pivot by a distance $d_2$. The HMD also includes a second arcuate aperture extending between third and fourth end points and is further positioned within third and fourth quadrants of the disc. The third endpoint is positioned at about the centerline of the disc and is spaced from the pivot by a distance $d_3$. The fourth endpoint is positioned at about the centerline of the disc and is spaced from the pivot by a distance $d_4$. The first quadrant is positioned opposite of the fourth quadrant with respect to the center line and the third quadrant is positioned opposite of the second quadrant with respect to the center line. The HMD further includes a first elongated member having opposing ends. A first end of the first elongated member is slidably engaged with the first arcuate aperture. A second end of the first elongated member is coupled to a first mirror/lens attachment mount. In addition, the HMD includes a second elongated member having opposing ends. A first end of the second elongated member is slidably engaged with the second arcuate aperture. A second end of the second elongated member is coupled to a second mirror/lens attachment mount.

BRIEF DESCRIPTION OF THE FIGURES

The foregoing and other features and advantages of the disclosure will be apparent from the more particular description of embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION

Conventional near-eye display systems are sold with a set of frames and cannot be mounted to any arbitrary frame. Such systems are undesirable to consumers. Many consumers require custom frames that accommodate a distinct pupillary distance (PD) of each consumer. Thus, those consumers cannot utilize the near-eye display system because the system is not sold with frames that accommodate their particular PD.

Further, each consumer has a distinct pupillary distance (PD) between each eye. PD is the distance between the centers of each pupil of a consumer's eyes. Having a correct PD between lenses of a near-eye-display system is extremely important, in particular for prescription optical lenses, because every lens has an optical center. The optical center of a lens gives the consumer the truest vision and should be directly in front of the consumer's pupil. Because the set of frames sold with conventional near-eye display systems are limited to a few types, consumers would suffer if the distance between lenses of the few types of frames is do not match his PD.

Embodiments of the present disclosure relate to a head mounted device that enables adjustment of lenses for a particular consumer. In some example embodiments, the head mounted device enables up to three-degrees of freedom of lens alignment with respect to a consumer's pupil.

Figure 1:
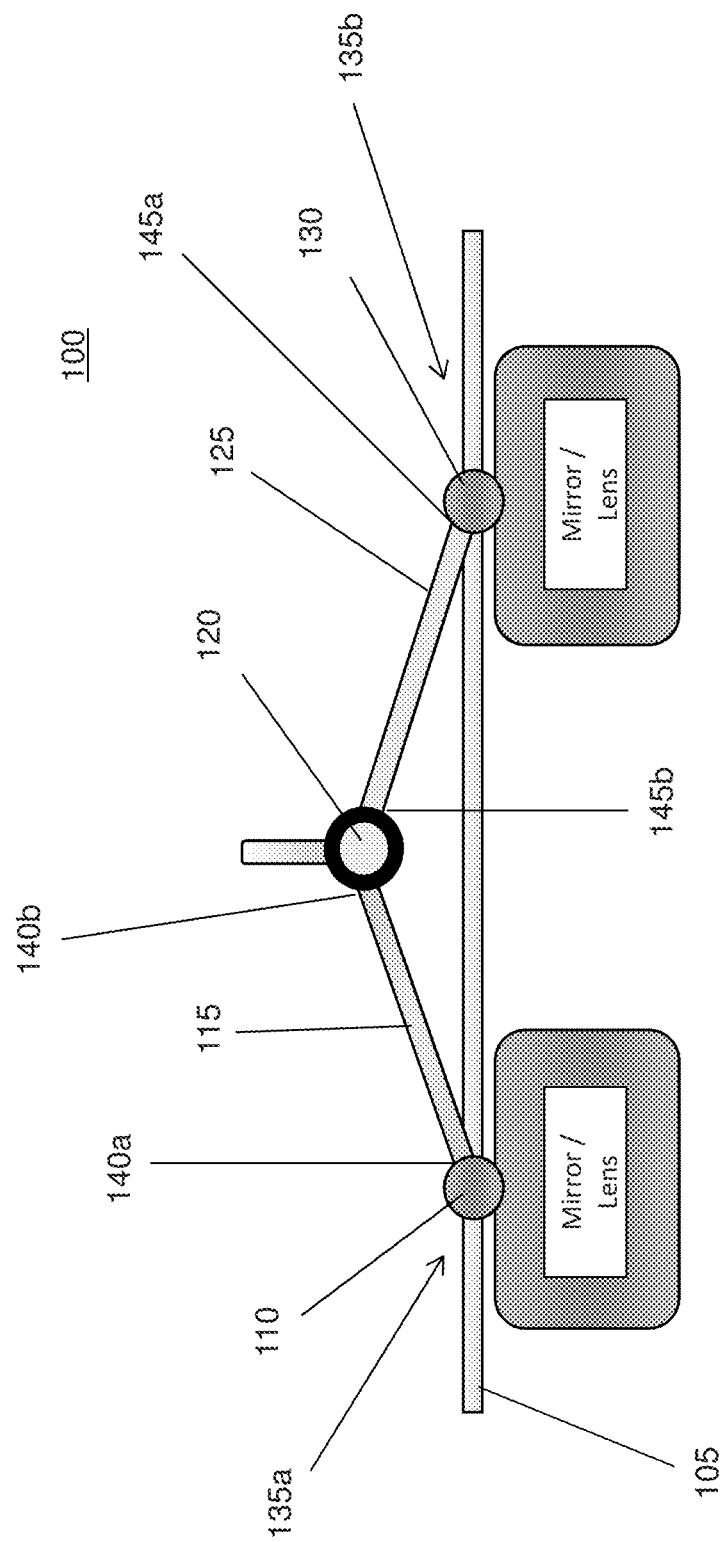
FIG. 1 is a block diagram of a frame for a head mounted device (HMD), in accordance with an example embodiment of the present disclosure.

FIG. 1 is a block diagram of a head mounted device (HMD) 100. The HMD 100 enables three degrees of freedom in each mirror/lens of the HMD 100. In other words, a consumer is able to adjust the position of each mirror/lens to accommodate a consumer's preference (e.g., to accommodate a pupillary distance (PD) of the consumer). The HMD 100 includes a facebar 105, a first mirror/lens attachment mount 110, a first rod 115, an actuator 120, a second rod 125, and a second mirror/lens attachment mount 130.

The first mirror/lens attachment mount 110 is slidably engaged with the facebar 105 at a first longitudinal location 135a. For example, the first longitudinal location 135a along the facebar 105 can be in substantial alignment with a location of a first pupil (not shown) of a consumer's eyes. In particular, the first mirror/lens attachment mount 110 is positioned to align an optical center of a first lens with the optical center of the first pupil. Further, the first mirror/lens attachment mount 110 is slidably engaged with the facebar 105 in a manner that enables movement of the first mirror/lens attachment mount 110 along a longitudinal axis of the facebar 105. In addition, such engagement is capable of tilting of the first mirror/lens attachment mount 110 around a width-wise circumference of the facebar 105.

A first end 140a of the first rod 115 is pivotally coupled to the first mirror/lens attachment mount 110. The pivotal coupling enables translation of the first rod 115 about a central axis of the first mirror/lens attachment mount 110. In this example, the central axis of the first mirror/lens attachment mount 110 is the axis going into the page of FIG. 1 (i.e., perpendicular to the plane the page). A second end 140b of the first rod 115 is pivotally engaged with the actuator 120. A second end 145b of the second rod 125 is also pivotally coupled to the actuator 120. Accordingly, translation of the actuator 120 along the axis perpendicular to the longitudinal axis of the facebar 105 causes pivoting of each of the second ends 140b, 145b of the first and second rods 115, 125 about a central axis of the actuator 120 (i.e., the axis perpendicular to the plane of the page of FIG. 1). For instance, translation of the actuator 120 away from the facebar 105 causes pivoting of the first and second rods 115, 125 such that the first mirror/lens attachment mount 110 and the second mirror/lens attachment mount 130 are drawn together. Hence, translation of the actuator 120 in the opposite direction causes the first mirror/lens attachment mount 110 and the second mirror/lens attachment mount 130 to be drawn to opposing ends of the facebar 105.

A first end 145a of the second rod 125 is pivotally coupled to the second mirror/lens attachment mount 130. The second mirror/lens attachment mount 130 is slidably engaged with the facebar 105 at a second longitudinal location 135b. For example, the second longitudinal location 135b along the facebar 105 can be in substantial alignment with a location of a second pupil (not shown) of a consumer's eyes. In particular, the second mirror/lens attachment mount 130 is positioned to align an optical center of a second lens with the optical center of the second pupil. The pivotal coupling between the second rod 125 and the second mirror/lens attachment mount 130 enables translation of the second rod 125 about a central axis of the second mirror/lens attachment mount 130. In this example, the central axis of the second mirror/lens attachment mount 130 is the axis going into the page of FIG. 1 (i.e., perpendicular to the plane the page). Such pivoting promotes movement of the second mirror/lens attachment mount 130 as discussed above. In addition, such slidable engagement enables tilting of the first mirror/lens attachment mount 130 around a width-wise circumference of the facebar 105.

Figure 2:
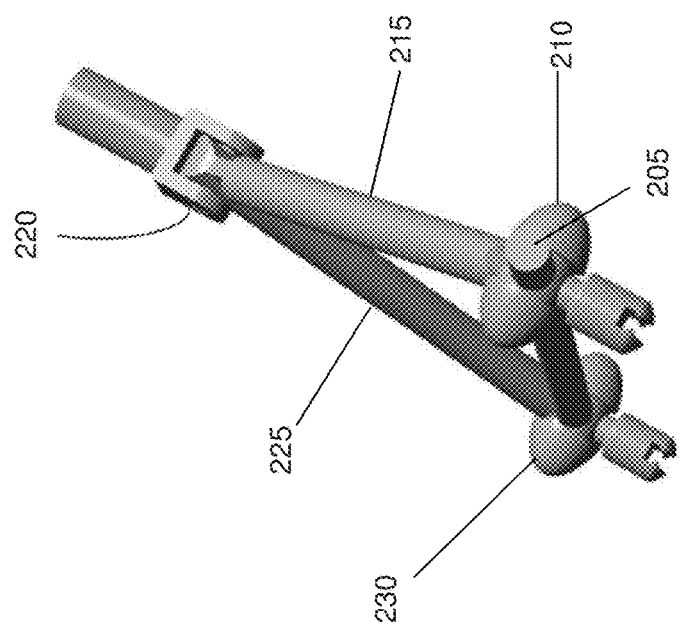
FIG. 2 is a schematic illustration of a head mounted display (HMD) in accordance with an example embodiment of the present disclosure.

FIG. 2 is a schematic illustration of a portion of ahead mounted display (HMD) 200 in accordance with an example embodiment of the present disclosure. The HMD 200 includes a facebar 205, a first mirror/lens attachment mount 210, a first rod 215, an actuator 220, a second rod 225, and a second mirror/lens attachment mount 230.

FIGS. 3-6 are schematic exploded views of each element of a portion of a head mounted display HMD 300 (HMD 300 is an example of HMD 200 of FIG. 2). The HMD 300 includes a mirror/lens attachment mount 330. The mirror/lens attachment mount 330 includes a base 331a defining a channel 331b through a width of the base 331a. The channel 331b is dimensioned to receive at least a portion of the facebar 305. In addition, the base 331a includes a pivot joint 331c protruding from a bottom surface of the base 331a. A mirror/lens interface 333 interfaces with the pivot joint 331c forming a rotational friction fit such that a lens can rotate around a width-wise circumferential axis of the pivot joint 331c. For instance, the mirror/lens interface 333 has a body 332a extending from a first end 332b to a second end 332c. The first end 332b includes an orifice 334 that defines a volume expanding into the first end 332b of the mirror/lens interface 333. The volume is dimensioned to receive the pivot joint 331c via a friction fit. A pressure provided by the friction fit allows for rotation of the mirror/lens interface 333 as stated above. The second end 332c of the mirror/lens interface 333 includes a friction fit clamp 332d that couples to a mirror/lens. It should be noted that the other mirror/lens attachment mount 310 depicted in FIG. 3 has a substantially similar structure.

Figure 3:
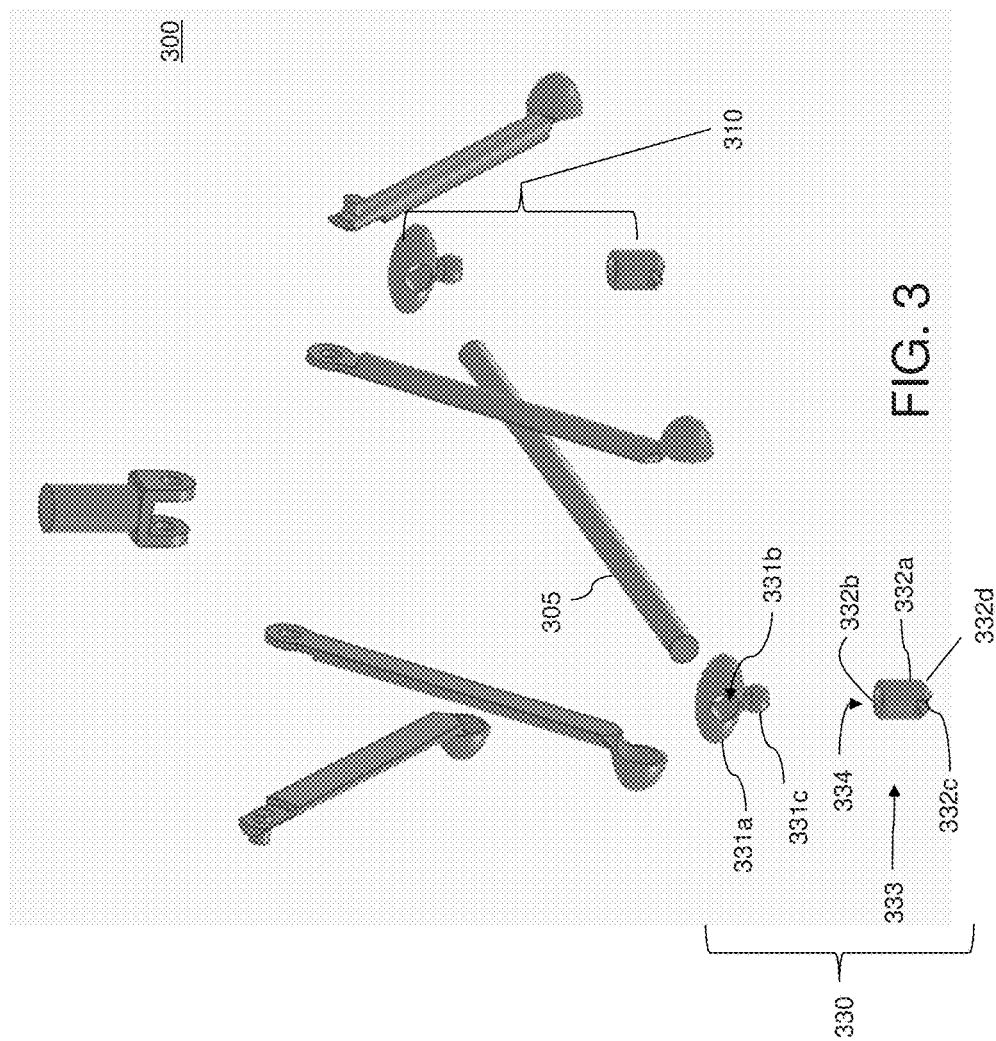
FIGS. 3-6 are exploded views of each element of a head mounted display (HMD) in accordance with an example embodiment of the present disclosure.
Figure 4:
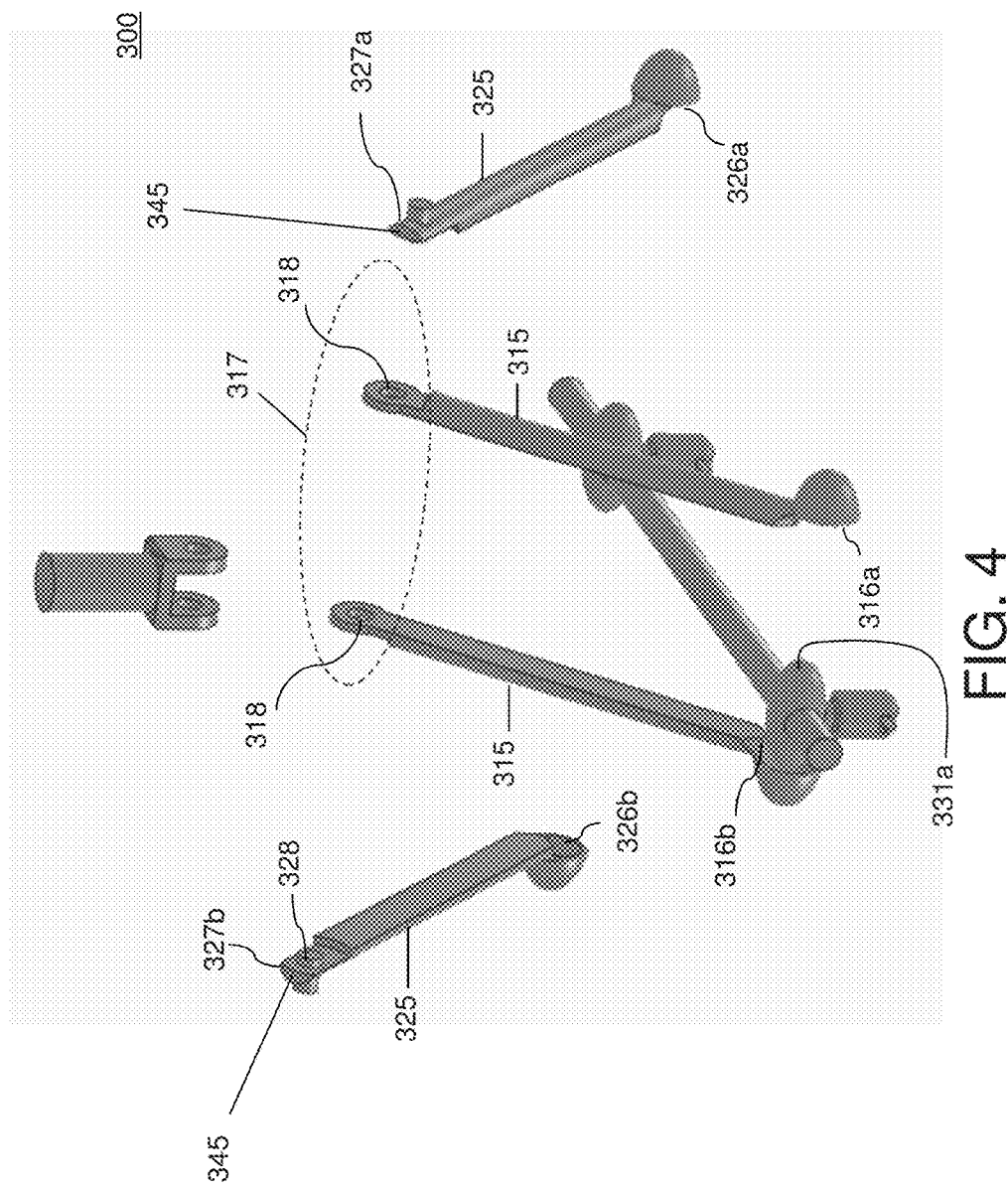
Figure 5:
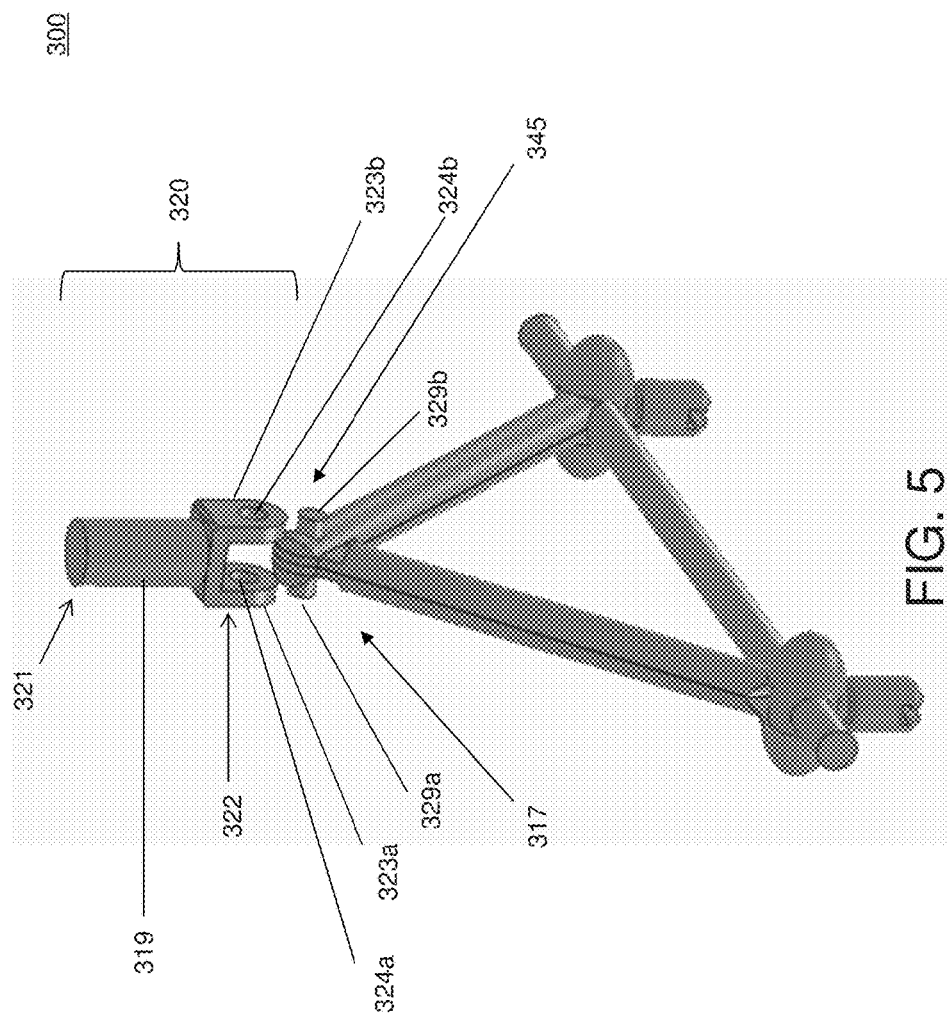

Referring to FIG. 4, the HMD 300 also includes a first rod 315 and a second rod 325. Although, FIGS. 3-4 illustrate some elements (e.g., the first rod 315 and second rod 325) as having two halves, each of the elements can also generally be a single formed unit. The first rod 315 includes a first end that defines a pair of prongs 316a-b. In this example, each of the prongs 316a-b forms a cup. Each of the prongs 316a-b opposes a respective length-wise end of the base 331a of the mirror/lens mount 330. A distance between the prongs 316a-b, as illustrated in FIG. 5, is sufficient to maintain coupling with the mirror/lens mount 310 while also enabling pivoting of the first rod 315 around a width-wise circumference of the ends of the base. The first rod 315 extends from the first end to a second end 317 that defines a prong defining an aperture 318. The aperture 318 extends through the second end 317 and transverse to a longitudinal axis of the first rod 315.

The second end 317 of the first rod 315 forms an interdigitated fit with a second end 345 of the second rod 325. The second end 345 of the second rod 325 includes a pair of spaced-apart prongs 327a-b. The spacing between the spaced-apart prongs 327a-b is of a distance sufficient to receive the second end 317 of the first rod 315 (see FIG. 5). As illustrated, each of the spaced-apart prongs 327a-b includes pins 328. The pins 328 are dimensioned to extend transversely through a length of the second rod and are aligned with the aperture 318. The pins 328 are dimensioned to be received by the aperture 318. Once received by the aperture 318, the pins 328 form a pivotal engagement with the second end 317 of the first rod 315. In addition, the second rod 325 includes a first end that defines a pair of prongs 326a-b. In this example, each of the prongs 326a-b forms a cup. Each of the prongs 326a-b opposes a respective length-wise end of the base of the mirror/lens mount 330. A distance between the prongs 326a-b, as illustrated in FIG. 5, is sufficient to maintain coupling with the mirror/lens mount 330 while also enabling pivoting of the second rod 325 around a width-wise circumference of the ends of the base.

Figure 6:
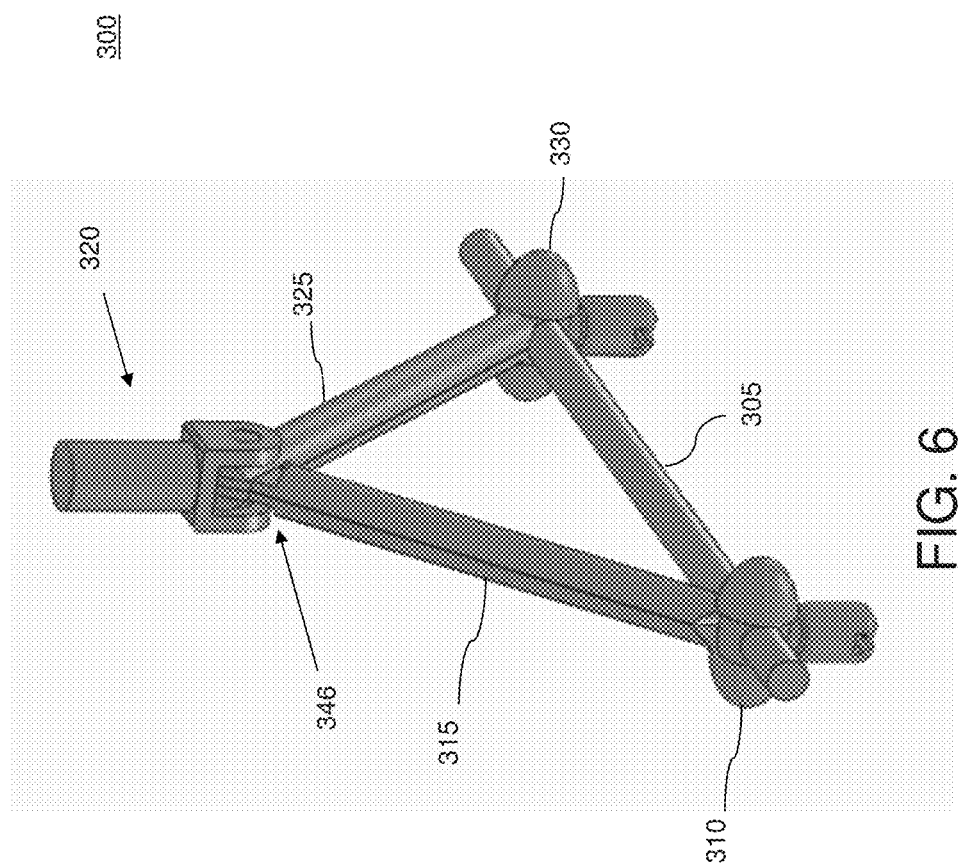

Referring to FIG. 5, actuator 320 includes a body 319 extending from a first end 321 to a second end 322. The second end 322 of the body 319 defines two spaced-apart actuator prongs 323a-b. Each of the two spaced-apart actuator prongs 323a-b includes orifices 324a-b that extend through each of the two spaced-apart actuator prongs 323a-b and transverse to a length of the actuator 320. A distance between the two spaced-apart actuator prongs 323a-b is configured to receive at least a portion of the interdigitated coupling between the second end 317 of the first rod 315 and the second end 345 of the second rod 325. As illustrated in FIG. 6, the actuator 320 forms a pivot coupling with the interdigitated coupling point 346 between the first rod 315 and the second rod 325. In the example illustrated, each of the pair of spaced-apart prongs 327a-b includes second pins 329a-b extending in a direction opposite to the pins 328 and each aligned with a respective one of the orifices 324a-b. Each of the orifices 324a-b is dimensioned to receive a respective one of the second pins 329a-b to form a pivotal coupling between the actuator 320 and the interdigitated coupling point 346 between the first rod 315 and the second rod 325.

Figure 7:
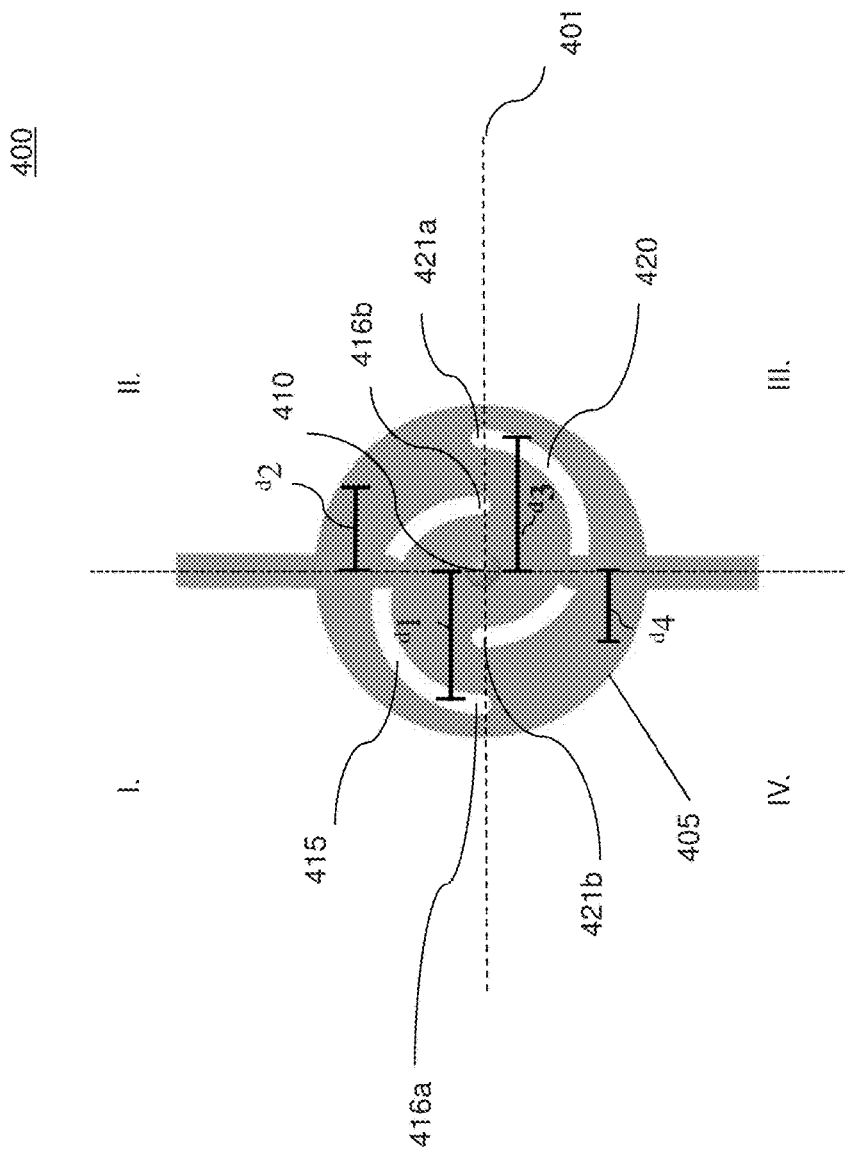
FIGS. 7-8 are schematic illustrations of another head mounted device (HMD), in accordance with an example embodiment of the present disclosure.
Figure 8:
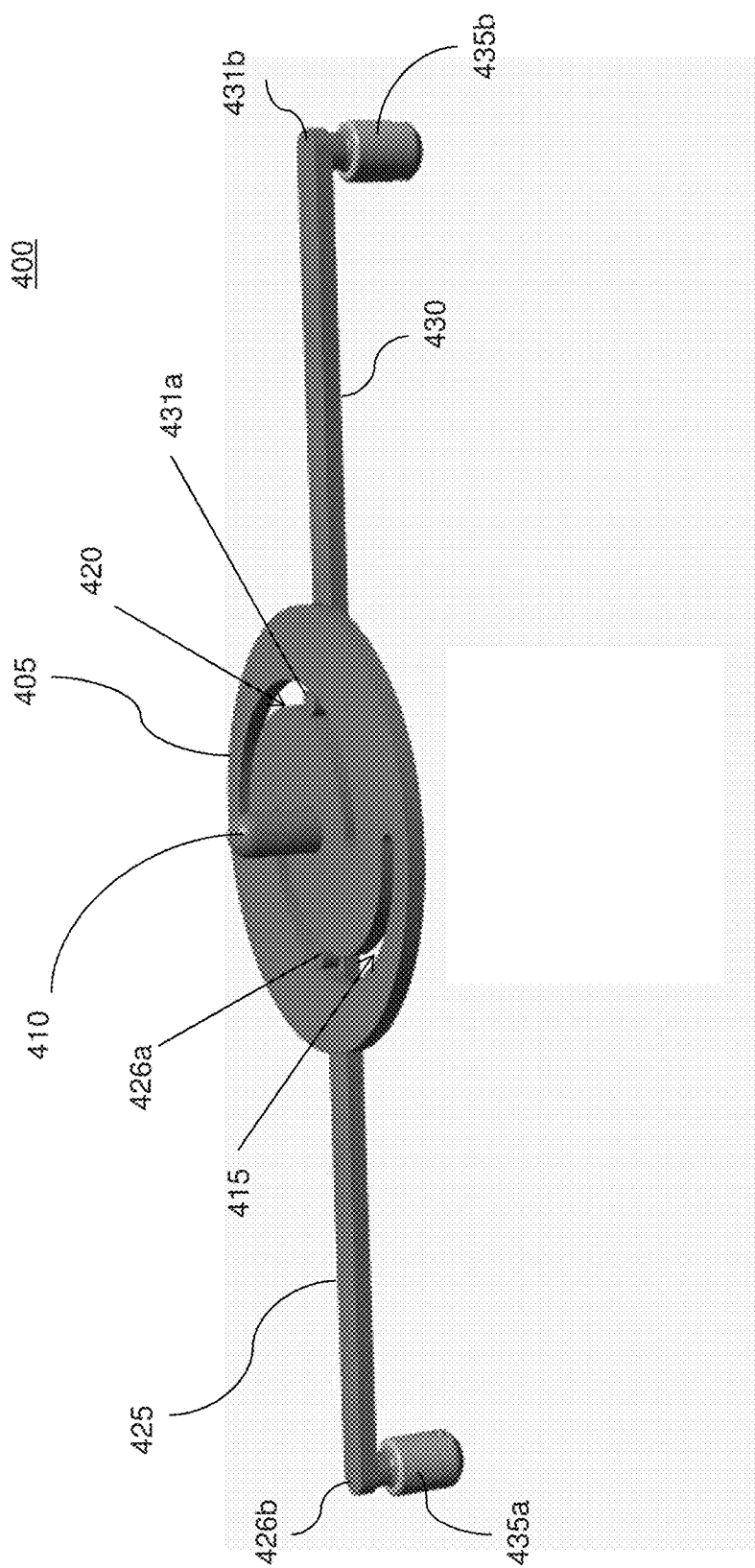

FIGS. 7-8 illustrate another portion of a head mounted device (HMD) 400, in accordance with an example embodiment of the present disclosure. The HMD 400 includes a disc 405 that includes a pivot 410 positioned at about a center thereof. The pivot 410 extends from a top surface of the disc to enable rotation of the disc 405 around the center thereof (e.g., a central axis).

A first arcuate aperture 415 extends between a first endpoint 416a and a second endpoint 416b. As illustrated, the first arcuate aperture 415 is positioned substantially within first and second quadrants (e.g., quadrants "I" and "II") of the disc 405. The first endpoint 416a is positioned at about a centerline 401 of the disc 405, where the centerline 401 extends through the pivot 410. The first endpoint 416a is further located at about the centerline 401 in a first half of the disc 405 that includes quadrant "I" and quadrant "IV". In addition, the first endpoint 416a is spaced from the pivot 410 by a distance $d_1$. The second endpoint 416b is positioned at about the centerline 401 of the disc 405. The second endpoint 416b is further located at about the centerline 401 in a second half of the disc 405 that includes quadrant "II" and quadrant "III". In addition, the second endpoint 416b is spaced from the pivot 410 by a distance $d_2$.

A second arcuate aperture 420 extends between a third endpoint 421a and a fourth endpoint 421b. As illustrated, the second arcuate aperture 420 is substantially positioned within third and fourth quadrants (e.g., quadrants "III" and "IV") of the disc 405. The third endpoint 421a is positioned at about a centerline 401 of the disc 405, where the centerline 401 extends through the pivot 410. The third endpoint 421a is further located at about the centerline 401 in a second half of the disc 405 that includes quadrant "II" and quadrant "III". In addition, the third endpoint 421a is spaced from the pivot 410 by a distance $d_3$. The fourth endpoint 421b is positioned at about the centerline 401 of the disc 405. The fourth endpoint 421b is further located at about the centerline 401 in the first half of the disc 405 that includes quadrant "I" and quadrant "IV". In addition, the fourth endpoint 421b is spaced from the pivot 410 by a distance $d_4$.

In this embodiment, the first quadrant is positioned opposite of the fourth quadrant with respect to the centerline 401. Similarly, the second quadrant is positioned opposite the third quadrant with respect to the centerline 401. In some embodiments, the second endpoint 416b is positioned at about the centerline in between the third endpoint 421a and the pivot 410. Additionally, the fourth endpoint 421b can be positioned about the centerline 401 in between the first endpoint 416a and the pivot 410. Further, in some embodiments, distance $d_1$ may be equivalent to distance $d_3$ and distance $d_2$ may be equivalent to distance $d_4$.

The HMD 400 also includes a first elongated member 425 and a second elongated member 430. The first elongated member includes a first end 426a that is slidably engaged with the first arcuate aperture 415. The second end 426b of the first elongated 425 member is coupled to a first mirror/lens attachment mount 435a. The second elongated member 430 includes a first end 431a and a second end 431b. The first end 431a of the second elongated member 430 is slidably engaged with the second arcuate aperture 420. The second end of the elongated member is coupled to a second mirror/lens attachment mount 435b.

Figure 9:
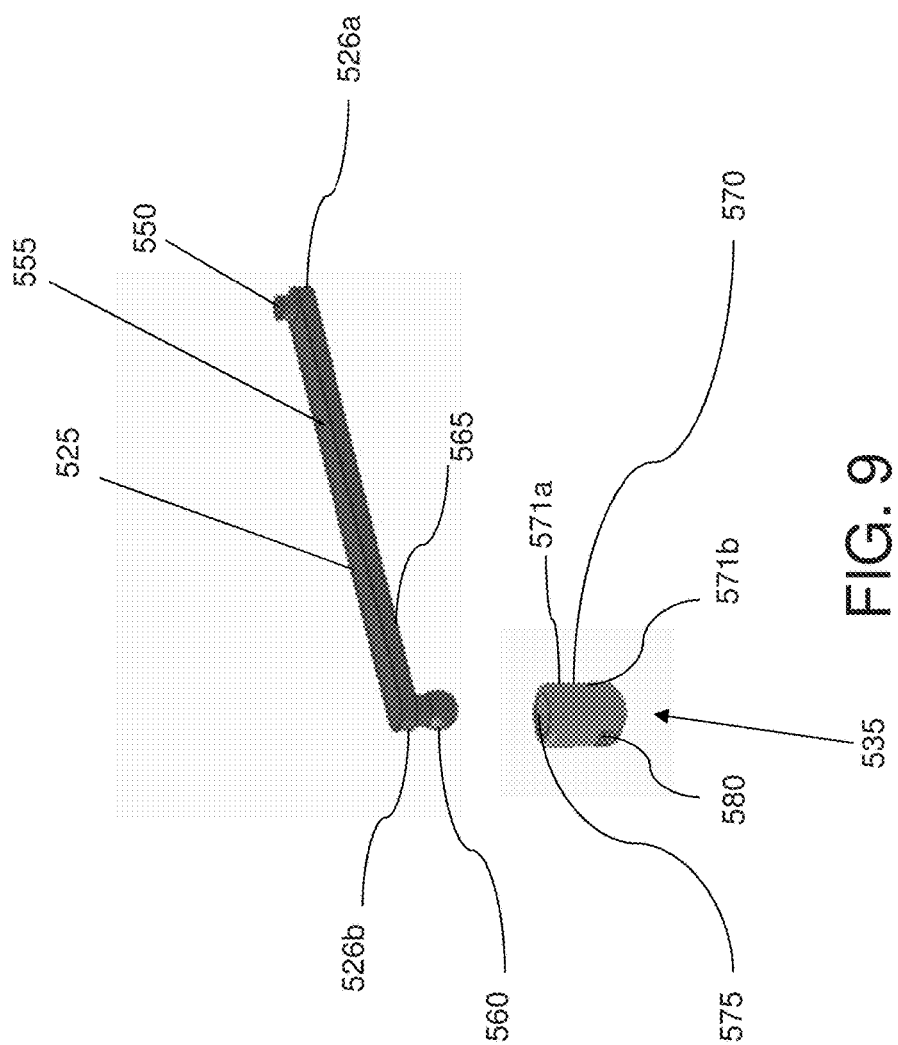
FIG. 9 is a schematic diagram of an elongated member and a mirror/lens attachment mount, in accordance with an example embodiment of the present disclosure.

FIG. 9 is a schematic diagram of an elongated member 525 and a mirror/lens attachment mount 535, in accordance with an example embodiment of the present disclosure. It should be noted that that the structure of elongated member 525 is substantially similar to the structure of both the first elongated member 425 and the second elongated member 430 of FIG. 8. In addition, the mirror/lens attachment mount 535 has a structure that is substantially similar to first and second mirror/lens attachment mounts 435a-b of FIG. 8.

As illustrated, the elongated member 525 includes first and second ends 526a-b. The first end 526a includes a pin 550 protruding from a first surface 555 of the elongated member 525. The pin 550 is dimensioned to slidably engage with an arcuate aperture (e.g., arcuate apertures 415, 420 of FIGS. 7-8). The second end 526b includes a pivot joint 560 protruding from a second surface 565 of the elongated member 525.

The mirror/lens attachment mount 535 has a body 570 extending from a first end 571a to a second end 571b. The first end 571a includes an orifice 575 that defines a volume expanding into the first end 571a of the mirror/lens attachment mount 535. The volume is dimensioned to receive the pivot joint 560 via a friction fit. A pressure provided by the friction fit allows for rotation of the mirror/lens attachment mount 535 as described above with respect to the mirror/lens interface 333. The second end 571b of the mirror/lens attachment mount 535 includes a friction fit clamp 580 that couples to a mirror/lens.

Figure 10:
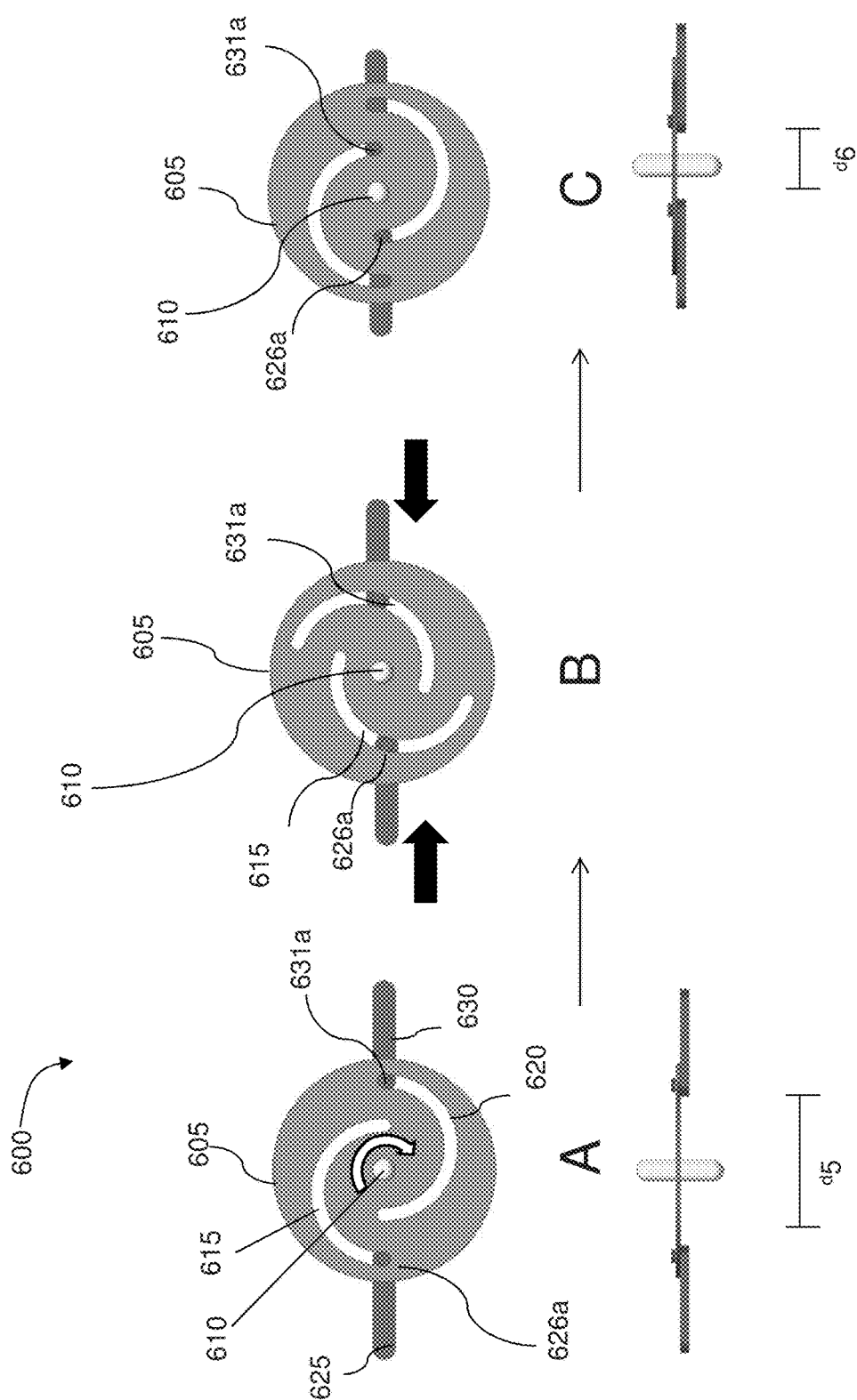
FIG. 10 is a functional flow diagram of an operation of a head mounted device (HMD) (e.g., the HMD of FIGS. 7-8).

FIG. 10 is a functional flow diagram of an operation of a portion of a head mounted device (HMD) 600 (e.g., HMD 400 of FIGS. 7-8). As illustrated in FIG. 10, rotation about a pivot 610 causes rotation of disc 605 which, in turn, causes translation of elongated members 625, 630 along a centerline of the disc 605. In this example, clock-wise rotation of the pivot 610 causes the HMD 600 to transition between states A, B, and C. At the initial state, state 'A', the elongated members 625 and 630 have a distance $d_5$ between endpoints 626a, 631a. Clock-wise rotation of the disc 605 causes the pins defined by each of the endpoints 626a, 631a to follow tracks defined by arcuate apertures 615, 620 thereby causes movement of the elongated members 625, 630. In this example, each of the endpoints 626a, 631a of elongated members 625, 630 are moving closer to pivot 610. As can be discerned from FIG. 10, a user can stop rotation of the pivot 610 in response to achieving a desired distance between the endpoints 626a, 631a which is in a direct relationship with the movement and location of lenses (not shown) attached to the elongated members 625, 630. The desired distance can place the endpoints 626a, 631a in any position between state 'A' and state 'C' (having a distance $d_6$ between the endpoints 626a, 631a) of the HMD 600. In this example, distance $d_5$ is the greatest distance each endpoint 626a, 631a can be from the pivot 610, while distance $d_6$ is the closest each endpoint 626a, 631a can be from the pivot 610.

Figure 11:
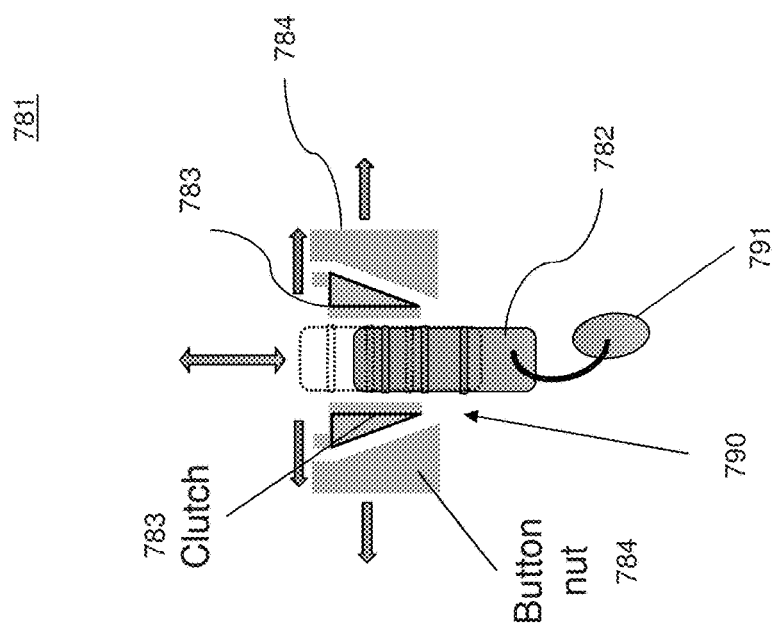
FIG. 11 is a schematic diagram of a clutch function nose pad, in accordance with an example embodiment of the present disclosure.

FIG. 11 is a schematic diagram of a clutch function nose pad 781, in accordance with an example embodiment of the present disclosure. The clutch function nose pad 781 includes a button nut 784, nose pad adjuster 782, and a clutch 783. The button nut 784 includes an oblong central aperture 790 (see FIG. 12 and FIG. 14). The oblong central aperture 790 extends through a thickness and first axis of the button nut 784. A major axis of the oblong aperture 790 is generally aligned with a second axis and the minor axis of the oblong aperture 790 is generally aligned with a third axis. The third axis is generally perpendicular with the second axis and on a same plane as the second axis. A nose pad adjuster 782 is at least partially positioned within the oblong aperture 790. The nose pad adjuster 782 has an elongated body extended from a first end to a second end. The second end is coupled to a pair of nose pads 791. A clutch 783 is positioned within the oblong aperture 790 and interposed between the button nut (e.g., the interior surface of the button nut) and the elongated body of the nose pad adjuster (e.g., the outer surface of the nose pad adjuster).

Figure 14:
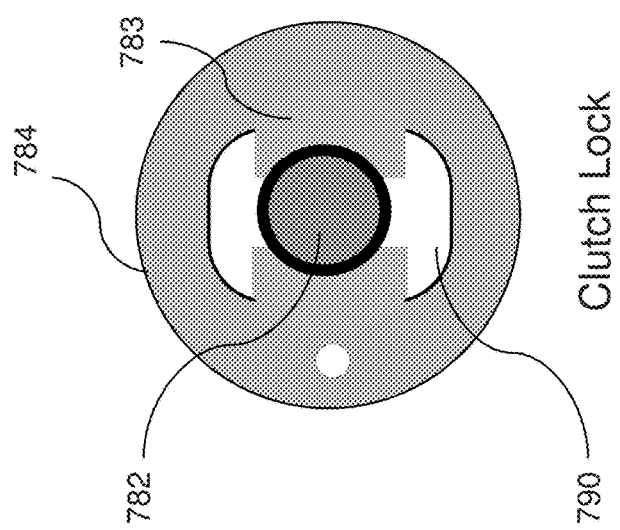
FIGS. 12-14 illustrate a schematic flow diagram of an operation of the clutch function nose pad of FIG. 11, in accordance with an example embodiment of the present disclosure.
Figure 13:
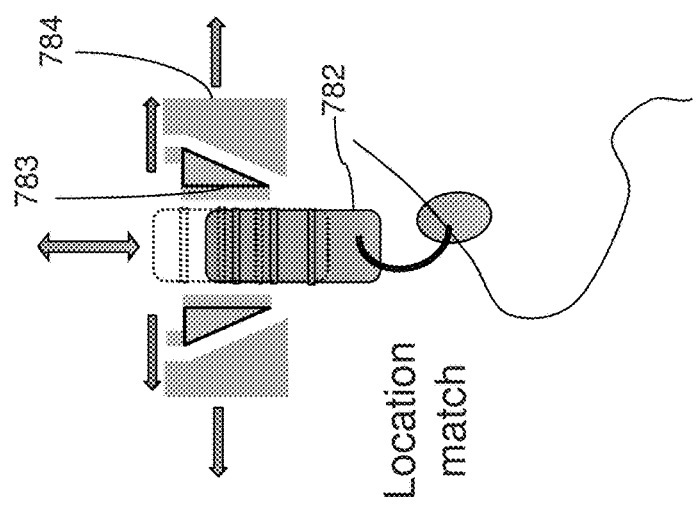
Figure 12:
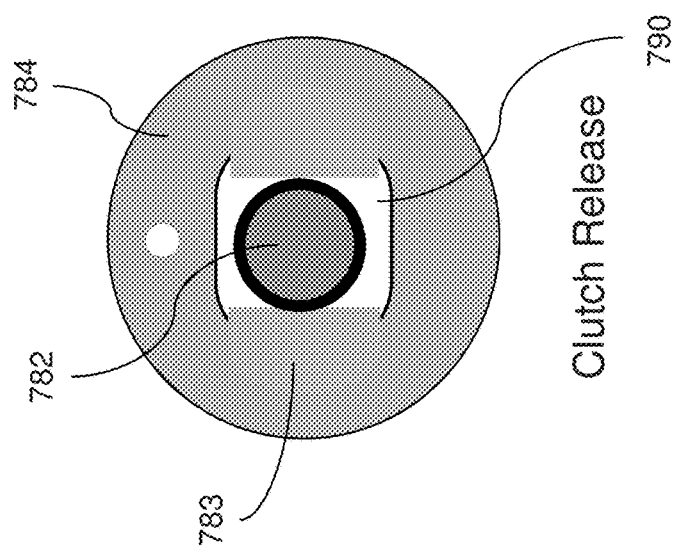

As illustrated in FIG. 12, the clutch function nose pad 781 can be in a first position (a "clutch release" position). In this position, the clutch 783 is positioned along the major axis of the oblong central aperture 790. In this position, the clutch 783 does not engage the nose pad adjuster 782 such that the nose pad adjuster 782 may be translated along the first axis as illustrated in FIG. 13. Rotation of the button nut 784 causes the clutch function nose pad 781 to transition into a second position (a "clutch lock" position) as illustrated in FIG. 14. In the second position, the clutch 783 is positioned along the minor axis of the oblong central aperture 790. In this position, the clutch 783 engages the nose pad adjuster 782 and inhibits movement of the nose pad adjuster 782 along the first axis.

Figure 15:
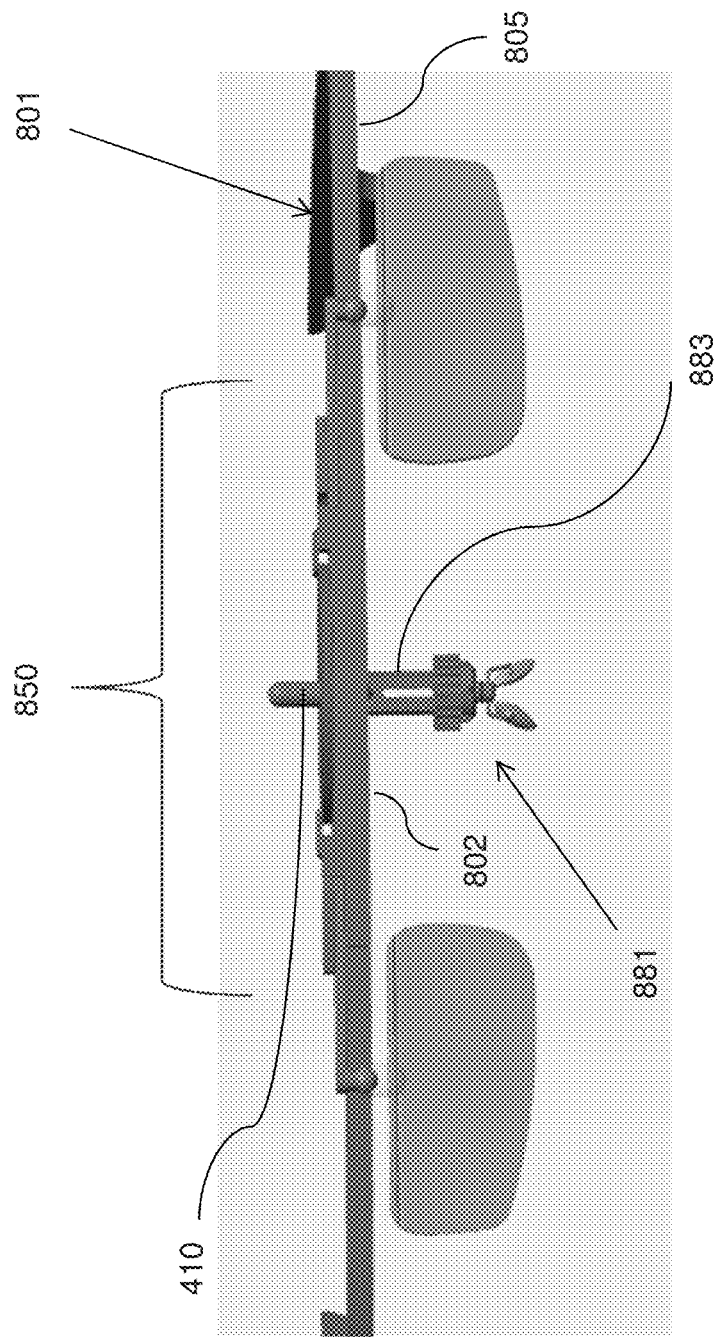
FIGS. 15-17 are schematic views of a frame to which the HMD of FIGS. 7-8 and the clutch function nose pad of FIG. 11 are coupled, in accordance with an example embodiment of the present disclosure.
Figure 16:
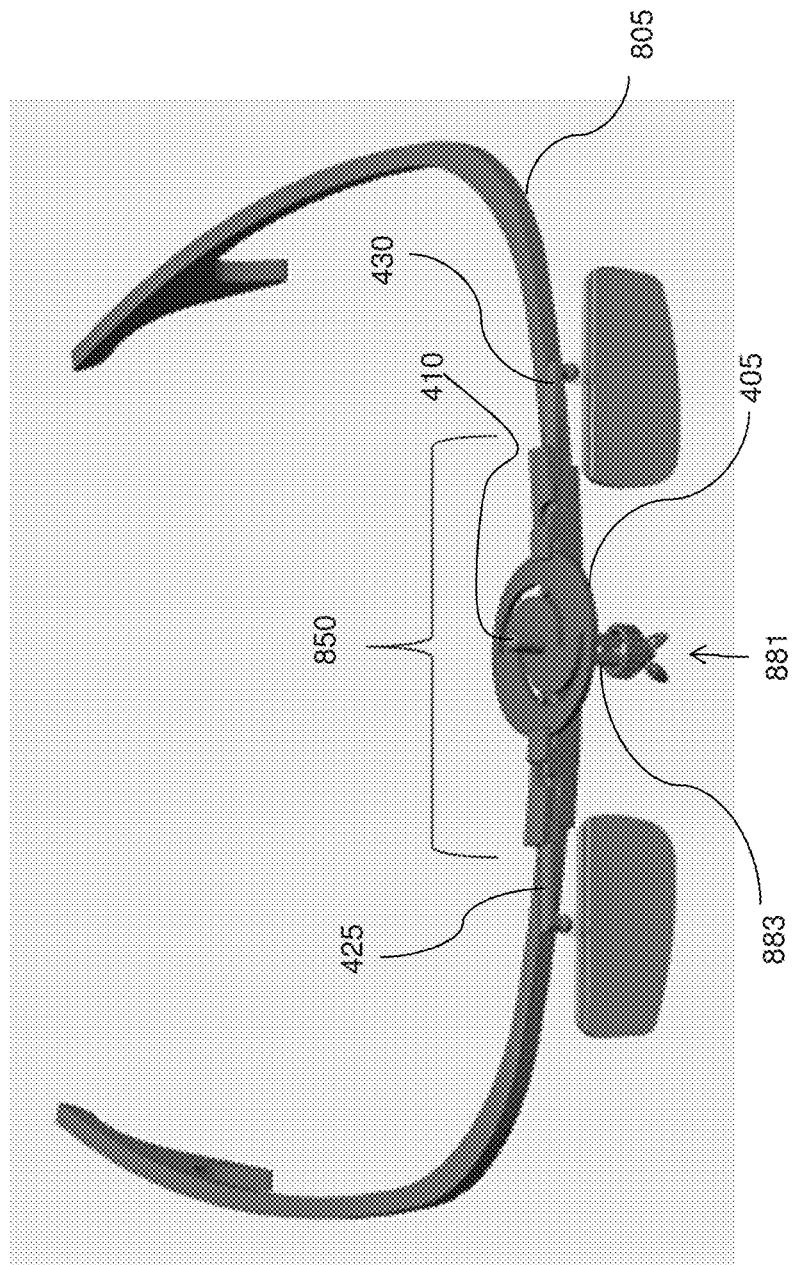
Figure 17:
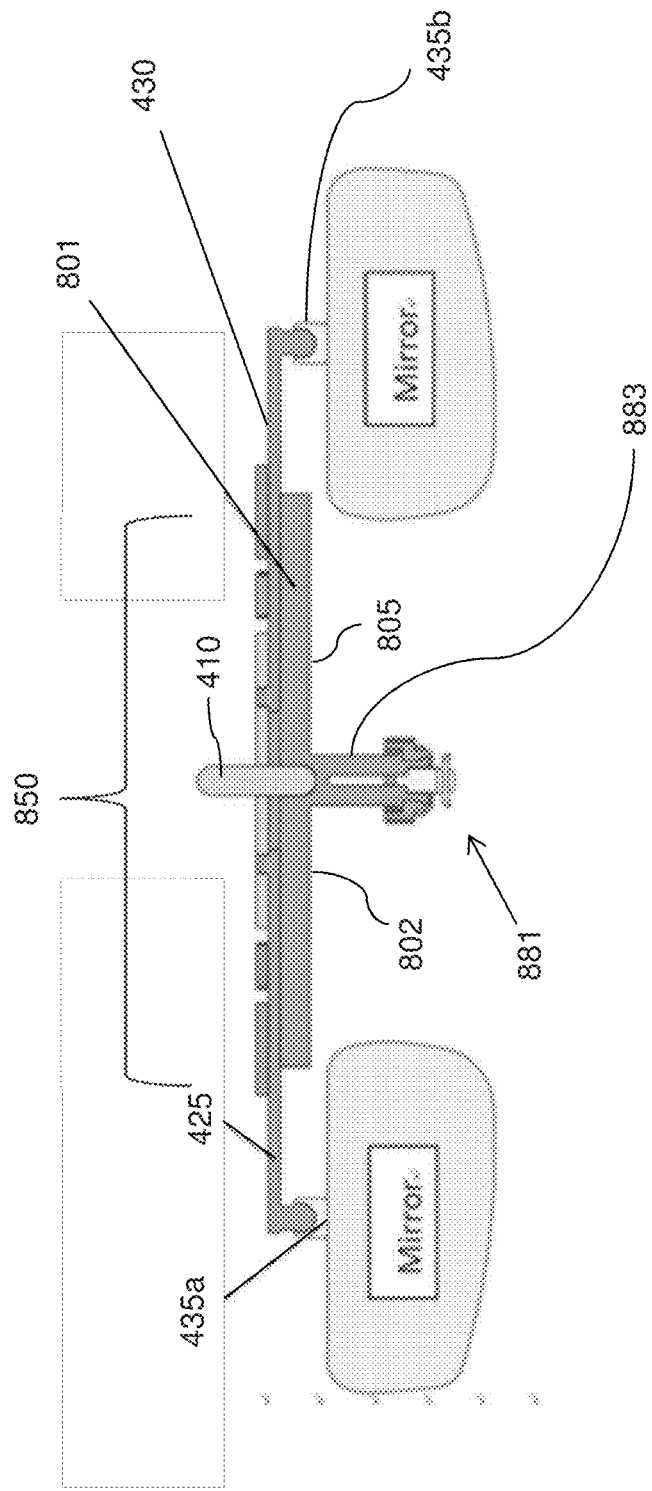

FIGS. 15-17 are schematic views of a frame 801 to which an HMD (e.g., the HMD 400 of FIGS. 7-8) and a clutch function nose pad 881 (e.g., the clutch function nose pad 781 of FIG. 11) are coupled. The frame 801 can include grooves, such as grooves 850, for receiving the HMD 400 that includes disc 405, the first elongated member 425, and second elongated member 430. The grooves 850 slidably receive the first elongated member 425 and second elongated member 430 to allow translation of the members 425, 430 along a longitudinal length of a facebar 805 the frame 801. The translation of the members 425, 430 occurs based on the operation described above with respect to FIG. 10.

The frame 801 further includes an elongated forked member 883. The elongated forked member extends from a bottom surface 802 of frame 801 and a central area of the facebar 805 that is in a position that below and aligned with the center of disc 405 and pivot 410. The elongated forked member 883 is coupled to a clutch function nose pad 881 (e.g., the clutch function nose pad 781 of FIG. 11).

Figure 18:
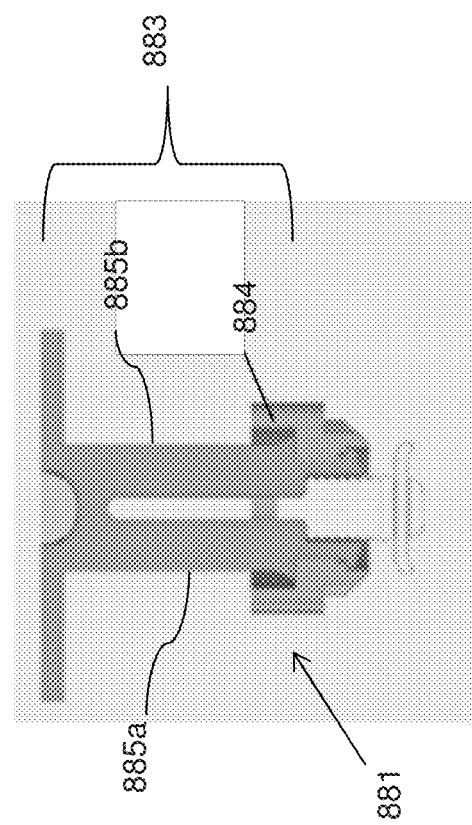
FIGS. 18-19 are schematic views of a clutch function nose pad coupled to the frame of FIGS. 15-17, in accordance with an example embodiment of the present disclosure.
Figure 19:
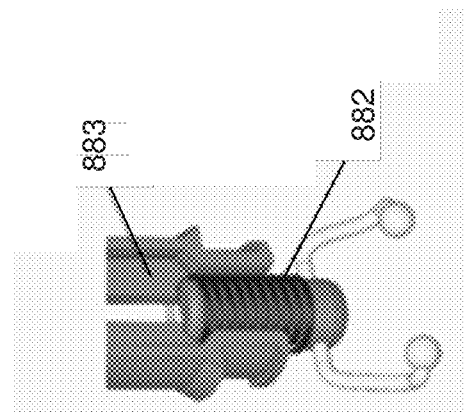

FIGS. 18-19 are schematic views of a clutch function nose pad 881 coupled to the frame 801 of FIGS. 15-17. The clutch function nose pad 881 includes a clutch 883 (which, in this example, is also the elongated forked member 883). The clutch 883 includes a first fork arm 885a and a second fork arm 885b. Each of the fork arms 885a-b is separated by a distance sufficient to accommodate a nose pad adjuster 882. In addition, the clutch function nose pad 881 includes a button nut 884. The arrangement between the clutch 883, button nut 884, and nose pad adjuster 882 is equivalent the description of the clutch function nose pad 781 of FIG. 11. In addition, the button nut 884 has a substantially similar structure to the button nut 784 of FIG. 11. Accordingly, as the button nut 884 is rotated from the first position (the "clutch release" position) to the second position (the "clutch lock" position), the oblong aperture causes each of the fork arms 885a-b to pinch the nose pad adjuster. This pinching action inhibits movement of the nose pad adjuster 882 as described in FIG. 12. As illustrated, the nose pad adjuster is ribbed in this example to further provide frictional engagement with the fork arms 884a-b to inhibit movement of the nose pad adjuster 882. Conversely, rotation from the second position to the first position, causes the fork arms to un-pinch the nose pad adjuster 882, thereby enabling translation of the nose pad adjuster 882 as described in FIG. 12.

Combinations of Features

Features described above as well as those claimed below may be combined in various ways without departing from the scope hereof. The following examples illustrate some possible, non-limiting combinations:

(A1) A pupillary lens adjustable head mounted device (HMD) includes a facebar. A first mirror/lens attachment mount is slidably engaged with the facebar at a first longitudinal location of the facebar. A first rod includes i) a first end pivotally coupled to the first mirror/lens attachment mount, and ii) a second end pivotally coupled to an actuator. A second rod includes i) a first end pivotally coupled to a second mirror/lens attachment mount, which is slidably engaged with the facebar at a second longitudinal location of the facebar, and ii) a second end pivotally coupled to the actuator.

(A2) In the HMD denoted by (A1), each of the first mirror/lens mount and the second mirror/lens mount may include: i) a base defining a channel through a width of the base, wherein the channel slidably receives at least a portion of the facebar, ii) a pivot joint protruding from a bottom surface of the base, and iii) a mirror/lens interface having a body extending from a first end to a second end, wherein the first end includes an orifice defining a volume expanding into the first end of the body, wherein the volume receives the pivot joint via a friction fit, and wherein the second end includes a friction fit clamp that couples to a mirror/lens.

(A3) In a HMD denoted by any one of (A1) and (A2), the first rod further may include a first pair of prongs at the first end of the first rod, each prong defining a cup that cups opposing length-wise ends of the base of the first mirror/lens mount to promote pivoting of the first rod around a width-wise circumference of the ends of the base of the first mirror/lens mount. In addition, the second rod may further include a second pair of prongs at the first end of the second rod, each prong defining a cup that pivotally cups opposing length-wise ends of the base of the second mirror/lens mount to promote pivoting of the second rod around a width-wise circumference of the ends of the base of the second mirror/lens mount.

(A4) In a HMD denoted by any combination of (A1) through (A3), the second end of the first rod may include a first prong that defines an aperture extending through the first prong and transverse to a length of the first rod. In addition, the second end of the second rod includes a pair of spaced apart prongs. Further, the first prong is received between the pair of spaced-apart prongs forming an interdigitated fit between the second end of the first rod and the second end of the second rod and each of the pair of spaced-apart prongs including a first pin extending transverse to a length of the second rod and aligned with the aperture defined by the first prong, wherein the pin forms a pivotal engagement with the second end of the first rod and the second end of the second rod.

(A5) In a HMD denoted by any one of (A1) through (A4), the actuator may include a body having two ends, wherein one end of the body defines two spaced-apart actuator prongs. In addition, each actuator prong defines an aperture extending through each actuator prong and transverse to a length of the body. Furthermore, a distance of the two spaced-apart actuator prongs is sufficient to receive at least a portion of the interdigitated fit between the second end of the first rod and the second end of the second rod, wherein each of the pair of spaced-apart prongs includes a second pin extending in a direction opposite to the first pin and aligned with the aperture of each of the two spaced-apart actuator prongs.

(B1) A pupillary lens adjustable head mounted device (HMD) is coupled to a glasses frame. The HMD includes a disc having a pivot positioned at about a center thereof. The pivot extends from a top surface of the disc to enable rotation of the disc around a central axis of the disc. A first arcuate aperture extends between first and second end points and is further positioned within first and second quadrants of the disc. The first endpoint is positioned at about a centerline of the disc and is spaced from the pivot by a distance $d_1$. In this embodiment, the centerline extends through the pivot. The second endpoint is positioned at about the centerline of the disc and is spaced from the pivot by a distance $d_2$. The HMD also includes a second arcuate aperture extending between third and fourth end points and is further positioned within third and fourth quadrants of the disc. The third endpoint is positioned at about the centerline of the disc and is spaced from the pivot by a distance $d_3$. The fourth endpoint is positioned at about the centerline of the disc and is spaced from the pivot by a distance $d_4$. The first quadrant is positioned opposite of the fourth quadrant with respect to the center line and the third quadrant is positioned opposite of the second quadrant with respect to the center line. The HMD further includes a first elongated member having opposing ends. A first end of the first elongated member is slidably engaged with the first arcuate aperture. A second end of the first elongated member is coupled to a first mirror/lens attachment mount. In addition, the HMD includes a second elongated member having opposing ends. A first end of the second elongated member is slidably engaged with the second arcuate aperture. A second end of the second elongated member is coupled to a second mirror/lens attachment mount.

(B2) In the HMD denoted by (B1), a clutch function nose pad may be coupled to the glasses frame at a position below a bottom surface of the disc. The clutch function nose pad includes: i) a button nut including an oblong central aperture extending through a thickness and generally aligned with a first axis of the button nut, wherein a major axis of the oblong central aperture generally aligned with a second axis and a minor axis of the oblong central aperture generally aligned with a third axis, the third axis generally perpendicular with the second axis an on a same plane as the second axis, ii) a nose pad adjuster including an elongated body extending from a first end to a second end and at least a portion thereof positioned within the oblong aperture, wherein a pair of nose pads are coupled to the second end, and iii) a clutch positioned within the oblong aperture and interposed between an interior surface of the button nut and the elongated body of the nose pad adjuster. In a first position, clutch is positioned along the major axis of the oblong central aperture and does not engage the nose pad adjuster such that the nose pad adjuster may be translated along the first axis. In a second position, the clutch is positioned along the minor axis of the oblong central aperture and engages the body of the nose pad adjuster inhibiting movement of the nose pad adjuster along the first axis.

(B3) In a HMD denoted by any one of (B1) and (B2), the first end of the first elongated member may include a first pin protruding from a first surface of the first elongated member. Also, the first pin is dimensioned to slidably engage with the first arcuate aperture and the second end of the first elongated member includes a first pivot joint protruding from a second surface of the first elongated member.

(B4) In a HMD denoted by any one of (B1) through (B3), the first mirror/lens attachment mount may include a body extending from a first end to a second end. The first end includes a first orifice defining a first volume expanding into the first end of the body, wherein the first volume receives the first pivot joint via a friction fit, and wherein the second end includes a first friction fit clamp that couples to a first mirror/lens.

(B5) In a HMD denoted by any one of (B1) through (B4), the first end of the second elongated member may include a second pin protruding from a first surface of the second elongated member. In addition, the second pin is dimensioned to slidably engage with the second arcuate aperture and the second end of the second elongated member includes a second pivot joint protruding from a second surface of the second elongated member.

(B6) In a HMD denoted by any one of (B1) through (B5), the second mirror/lens attachment mount may include a body extending from a first end to a second end, wherein the first end includes a second orifice defining a second volume expanding into the first end of the body, wherein the second volume receives the second pivot joint via a friction fit, and wherein the second end includes a second friction fit clamp that couples to a second mirror/lens.

(B7) In a HMD denoted by any one of (B1) through (B6), the second endpoint may be positioned at about the centerline between the third endpoint and the pivot and wherein the fourth endpoint is positioned about the centerline between the first endpoint and the pivot.

(B8) In a HMD denoted by any one of (B1) through (B7), may further define distances wherein $d_1=d_3$ and wherein $d_2=d_4$.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:
1. A pupillary lens adjustable head mounted device (HMD), the HMD comprising:

a facebar;
a first mirror/lens attachment mount slidably engaged with the facebar at a first longitudinal location of the facebar;
an actuator including a body having two ends, wherein one end of the body defines two spaced-apart actuator prongs, each actuator prong defining an aperture extending through each actuator prong and transverse to a length of the body
a first rod having:
  a first end pivotally coupled to the first mirror/lens attachment mount, and
  a second end pivotally coupled to the actuator and including a first prong that defines an aperture extending through the first prong and transverse to a length of the first rod; and
a second rod having:
  a first end pivotally coupled to a second mirror/lens attachment mount and slidably engaged with the facebar at a second longitudinal location of the facebar, and
  a second end pivotally coupled to the actuator and including a pair of spaced-apart prongs, wherein
  the first prong is received between the pair of spaced-apart prongs forming an interdigitated fit between the second end of the first rod and the second end of the second rod; and
  each of the pair of spaced-apart prongs including a first pin extending transverse to a length of the second rod and aligned with the aperture defined by the first prong, the pin forming a pivotal engagement with the second end of the first rod and the second end of the second rod
  a distance of the two spaced-apart actuator prongs being sufficient to receive at least a portion of the interdigitated fit between the second end of the first rod and the second end of the second rod, and wherein each of the pair of spaced-apart prongs includes a second pin extending in a direction opposite to the first pin and aligned with the aperture of each of the two spaced-apart actuator prongs.

2. The HMD of claim 1, wherein each of the first mirror/lens mount and the second mirror/lens mount includes:
a base defining a channel through a width of the base, wherein the channel slidably receives at least a portion of the facebar,
a pivot joint protruding from a bottom surface of the base, and
a mirror/lens interface having a body extending from a first body-end to a second body-end, wherein the first end includes an orifice defining a volume expanding into the first body-end, wherein the volume receives the pivot joint via a friction fit, and wherein the second end includes a friction fit clamp that couples to a mirror/lens.

3. The HMD of claim 2,
the first rod further including:
  a first pair of prongs at the first end of the first rod, each prong defining a cup that cups opposing length-wise ends of the base of the first mirror/lens mount to promote pivoting of the first rod around a width-wise circumference of the ends of the base of the first mirror/lens mount, and
the second rod further including:
  a second pair of prongs at the first end of the second rod, each prong defining a cup that pivotally cups opposing length-wise ends of the base of the second mirror/lens mount to promote pivoting of the second rod around a width-wise circumference of the ends of the base of the second mirror/lens mount.

4. A pupillary lens adjustable head mounted device (HMD) coupled to a glasses frame, the HMD comprising:
a disc having a pivot positioned at about a center thereof, the pivot extending from a top surface of the disc to enable rotation of the disc around a central axis of the disc;
a first arcuate aperture extending between first and second end points and further positioned within first and second quadrants of the disc, wherein:
  the first endpoint is positioned at about a centerline of the disc and is spaced from the pivot by a distance $d_1$, the centerline extending through the pivot;
  the second endpoint is positioned at about the centerline of the disc and is spaced from the pivot by a distance $d_2$;
a second arcuate aperture extending between third and fourth end points and further positioned within third and fourth quadrants of the disc, wherein:
  the third endpoint is positioned at about the centerline of the disc and is spaced from the pivot by a distance $d_3$;
  the fourth endpoint is positioned at about the centerline of the disc and is spaced from the pivot by a distance $d_4$;
  wherein the first quadrant is positioned opposite of the fourth quadrant with respect to the center line and the third quadrant is positioned opposite of the second quadrant with respect to the center line;
a first elongated member having opposing ends, wherein:
  a first end of the first elongated member is slidably engaged with the first arcuate aperture;
  a second end of the first elongated member is coupled to a first mirror/lens attachment mount;
a second elongated member having opposing ends, wherein:
  a first end of the second elongated member is slidably engaged with the second arcuate aperture; and
  a second end of the second elongated member is coupled to a second mirror/lens attachment mount; and
a clutch function nose pad coupled to the glasses frame at a position below a bottom surface of the disc, and including:
  a button nut including an oblong central aperture extending through a thickness and generally aligned with a first axis of the button nut, wherein a major axis of the oblong central aperture generally aligned with a second axis and a minor axis of the oblong central aperture generally aligned with a third axis, the third axis generally perpendicular with the second axis an on a same plane as the second axis;
  a nose pad adjuster including an elongated body extending from a first end to a second end and at least a portion thereof positioned within the oblong aperture, wherein a pair of nose pads are coupled to the second end;
  a clutch positioned within the oblong aperture and interposed between an interior surface of the button nut and the elongated body of the nose pad adjuster;
  wherein, in a first position, the clutch is positioned along the major axis of the oblong central aperture and does not engage the nose pad adjuster such that the nose pad adjuster may be translated along the first axis; and wherein, in a second position, the clutch is positioned along the minor axis of the oblong central aperture and engages the body of the nose pad adjuster inhibiting movement of the nose pad adjuster along the first axis.

5. The HMD of claim 4, wherein the first end of the first elongated member includes a first pin protruding from a first surface of the first elongated member, the first pin dimensioned to slidably engage with the first arcuate aperture and wherein the second end of the first elongated member includes a first pivot joint protruding from a second surface of the first elongated member.

6. The HMD of claim 5, wherein the first mirror/lens attachment mount includes a body extending from a first end to a second end, wherein the first end includes a first orifice defining a first volume expanding into the first end of the body, wherein the first volume receives the first pivot joint via a friction fit, and wherein the second end includes a first friction fit clamp that couples to a first mirror/lens.

7. The HMD of claim 4, wherein the first end of the second elongated member includes a second pin protruding from a first surface of the second elongated member, the second pin dimensioned to slidably engage with the second arcuate aperture and wherein the second end of the second elongated member includes a second pivot joint protruding from a second surface of the second elongated member.

8. The HMD of claim 7, wherein the second mirror/lens attachment mount includes a body extending from a first end to a second end, wherein the first end includes a second orifice defining a second volume expanding into the first end of the body, wherein the second volume receives the second pivot joint via a friction fit, and wherein the second end includes a second friction fit clamp that couples to a second mirror/lens.

9. The HMD of claim 4, wherein the second endpoint is positioned at about the centerline between the third endpoint and the pivot and wherein the fourth endpoint is positioned about the centerline between the first endpoint and the pivot.

10. The HMD of claim 4, wherein $d_1=d_3$ and wherein $d_2=d_4$.

* * * * *

UNITED STATES PATENT AND TRADEMARK OFFICE
CERTIFICATE OF CORRECTION

PATENT NO. : 9,927,619 B2
APPLICATION NO. : 14/935096
DATED : March 27, 2018
INVENTOR(S) : Yen-Sung Wang Page 1 of 1

It is certified that error appears in the above-identified patent and that said Letters Patent is hereby corrected as shown below:

In the Claims

Column 11, Line 51-52, Claim 2 "the first end includes" should read --the first body-end includes--;
Line 54, "the second end" should read --the second body-end--;

Column 12, Line 60-61, Claim 4 "the oblong aperture," should read --the oblong central aperture,--;
Line 63, "the oblong aperture" should read --the oblong central aperture--.

Signed and Sealed this
Twenty-first Day of August, 2018

Andrei Iancu
*Director of the United States Patent and Trademark Office*